United States Patent
Eichbauer

[19]

[11] Patent Number: 5,907,943
[45] Date of Patent: Jun. 1, 1999

[54] STRETCH WRAP FILMS

[75] Inventor: George N. Eichbauer, Conyers, Ga.

[73] Assignee: Tenneco Packaging Inc., Evanston, Ill.

[*] Notice: This patent is subject to a terminal disclaimer.

[21] Appl. No.: 08/872,806

[22] Filed: Jun. 11, 1997

[51] Int. Cl.$^6$ ...................................................... B65B 53/00
[52] U.S. Cl. .................................................................. 53/441
[58] Field of Search ...................................... 53/441, 556

[56] References Cited

U.S. PATENT DOCUMENTS

| | | | |
|---|---|---|---|
| 3,645,992 | 2/1972 | Elston | 260/80.78 |
| 3,748,962 | 7/1973 | Hilkert et al. | 90/4 |

(List continued on next page.)

FOREIGN PATENT DOCUMENTS

| | | | |
|---|---|---|---|
| 0 600 425 | 11/1993 | European Pat. Off. | B32B 27/32 |
| WO 92/17539 | 10/1992 | WIPO | C08L 23/06 |
| WO 4/14855 | 7/1994 | WIPO | C08F 4/628 |
| WO 94/25271 | 11/1994 | WIPO | B32B 07/08 |
| WO 94/26816 | 11/1994 | WIPO | C08L 23/08 |

OTHER PUBLICATIONS

Leaversuch, R., "LDPE, mPE vie in Flexible Film Market", *Modern Plastics*, Sep. 1994, pp. 23 & 25.
Product Literature, *Recycling Loop for Stretch Film*, Mobil, 2 pgs.
Product Literature, *Stretch Film Recycling*, Mobil, 2 pgs.
Product Literature, *To Give Your Customers' Used Stretch Film A New Lease On Life, Turn The Page*, Mobil, 4 pgs.
Chowdhury, et al., "Polymers by Blueprint: Metallocene catalysts, the biggest thing to his plastics since LLDPE, transform workhorse resins into engineering plastics," *Chemical Engineering* (Apr. 1993), pp. 34–39.
Schut, "Competition for Metallocenes Could Turn Ugly," *Plastics World* (Jan. 1995), pp. 33–36.
Product Literature, Dow Chemical Company, "Dow Resins for Stretch Film Applications—An Overview", p. 1.5, Oct. 1994.
Product Literature, Dow Chemical Company, "Dow Skin Resins for Cast Stretch Film Applications", pp. 3.1–3.4, Oct. 1994.

(List continued on next page.)

*Primary Examiner*—Linda Johnson
*Attorney, Agent, or Firm*—Arnold White & Durkee

[57] ABSTRACT

A method for wrapping a multilayer, thermoplastic stretch wrap film containing at least three polymeric film layers and comprised of an inner polymeric layer. The inner polymeric layer comprises a blend of a low polydispersity polymer and either a high pressure low density polyethylene resin, a very low density polyethylene resin or a combination thereof. The low polydispersity polymer has a polydispersity of from about 1 to about 4, a melt index ($I_2$) of from about 0.5 to about 10 g/10 min., and a melt flow ratio ($I_{20}/I_2$) of from about 12 to about 22. The high pressure low density polyethylene resin has a melt index of from about 1 to about 10 g/10 min., and a density of from about 0.9 to about 0.935 g/cm$^3$. The very low density polyethylene resin has a melt index of from about 0.5 to about 5 g/10 min., and a density of from about 0.880 to about 0.912 g/cm$^3$. The stretch wrap film may include a first layer and a second layer. The first and second layers may comprise a polymer of two or more monomers, wherein a first monomer is ethylene, in a major amount by weight, and a second monomer is an alpha olefin of from about 3 to about 12 carbon atoms, in a minor amount by weight. If the first and second layers are outer layers, they have a cling force to each other of at least about 140 grams/inch. The stretch wrap film has a maximum stretch of at least 340% and a F-50 dart drop value of at least about 150 g/mil. It is contemplated that additional outer layers may be added such an outer high cling layer or an outer slip layer, as well as additional inner layers.

105 Claims, 1 Drawing Sheet

U.S. PATENT DOCUMENTS

| | | | |
|---|---|---|---|
| 3,986,611 | 10/1976 | Dreher | 206/386 |
| 4,011,382 | 3/1977 | Levine et al. | 526/96 |
| 4,050,221 | 9/1977 | Lancaster, III et al. | 53/211 |
| 4,076,698 | 2/1978 | Anderson et al. | 526/348.6 |
| 4,163,831 | 8/1979 | Gessell | 526/153 |
| 4,205,021 | 5/1980 | Morita et al. | 525/240 |
| 4,302,565 | 11/1981 | Goeke et al. | 526/88 |
| 4,302,566 | 11/1981 | Karol et al. | 526/125 |
| 4,359,561 | 11/1982 | Fraser et al. | 526/88 |
| 4,399,173 | 8/1983 | Anthony et al. | 428/35 |
| 4,399,180 | 8/1983 | Briggs et al. | 428/212 |
| 4,418,114 | 11/1983 | Briggs et al. | 428/218 |
| 4,461,873 | 7/1984 | Bailey et al. | 525/240 |
| 4,511,609 | 4/1985 | Craver et al. | 428/35 |
| 4,522,987 | 6/1985 | Hogan et al. | 526/106 |
| 4,565,720 | 1/1986 | Yaeo et al. | 428/35 |
| 4,574,104 | 3/1986 | Aishima et al. | 428/220 |
| 4,588,650 | 3/1986 | Mientus et al. | 428/516 |
| 4,808,561 | 2/1989 | Welborn, Jr. | 502/104 |
| 4,833,017 | 5/1989 | Benoit | 428/323 |
| 4,871,523 | 10/1989 | Datta et al. | 423/265 |
| 4,871,705 | 10/1989 | Hoel | 502/117 |
| 4,925,821 | 5/1990 | Chang | 502/107 |
| 4,925,825 | 5/1990 | Tachi et al. | 502/309 |
| 4,937,301 | 6/1990 | Chang | 526/128 |
| 5,001,205 | 3/1991 | Hoel | 526/128 |
| 5,006,500 | 4/1991 | Chang | 502/107 |
| 5,017,655 | 5/1991 | Kase et al. | 525/127 |
| 5,019,315 | 5/1991 | Wilson | 264/171 |
| 5,026,798 | 6/1991 | Canich | 526/127 |
| 5,032,652 | 7/1991 | Chang | 526/129 |
| 5,049,423 | 9/1991 | German, Jr. | 428/35.2 |
| 5,079,205 | 1/1992 | Canich | 502/117 |
| 5,084,534 | 1/1992 | Welborn, Jr. et al. | 526/160 |
| 5,085,927 | 2/1992 | Dohrer | 428/220 |
| 5,124,418 | 6/1992 | Welborn, Jr. | 526/114 |
| 5,173,343 | 12/1992 | Arvedson et al. | 428/34.9 |
| 5,183,867 | 2/1993 | Welborn, Jr. | 526/114 |
| 5,206,075 | 4/1993 | Hodgson, Jr. | 428/216 |
| 5,248,547 | 9/1993 | Wilson | 428/218 |
| 5,272,016 | 12/1993 | Ralph | 428/516 |
| 5,273,809 | 12/1993 | Simmons | 428/212 |
| 5,278,272 | 1/1994 | Lai et al. | 526/348.5 |
| 5,279,872 | 1/1994 | Ralph | 428/34.9 |
| 5,283,128 | 2/1994 | Wilhoit | 428/516 |
| 5,296,580 | 3/1994 | Matsunaga et al. | 53/441 X |
| 5,334,428 | 8/1994 | Dobreski et al. | 428/34.9 |
| 5,358,792 | 10/1994 | Mehta et al. | 428/516 |
| 5,374,459 | 12/1994 | Mumpower et al. | 428/36.7 |
| 5,376,439 | 12/1994 | Hodgson et al. | 428/220 |
| 5,380,810 | 1/1995 | Lai et al. | 56/352 |
| 5,382,631 | 1/1995 | Stehling et al. | 525/240 |
| 5,395,471 | 3/1995 | Obijeski et al. | 156/244.11 |
| 5,397,613 | 3/1995 | Georgelos | 428/36.7 |
| 5,397,640 | 3/1995 | Georgelos et al. | 428/349 |
| 5,399,426 | 3/1995 | Koch et al. | 428/335 |
| 5,407,732 | 4/1995 | Dokurno | 428/213 |
| 5,419,795 | 5/1995 | Wood et al. | 156/184 |
| 5,419,934 | 5/1995 | Wilson | 428/34.9 |
| 5,420,220 | 5/1995 | Cheruvu et al. | 526/348.1 |
| 5,431,284 | 7/1995 | Wilson | 206/597 |
| 5,451,450 | 9/1995 | Erderly et al. | 428/220 |
| 5,451,468 | 9/1995 | Seiler et al. | 428/515 |
| 5,460,861 | 10/1995 | Vicik et al. | 428/34.9 |
| 5,462,807 | 10/1995 | Halle et al. | 428/500 |
| 5,482,770 | 1/1996 | Bekele | 428/339 |
| 5,482,771 | 1/1996 | Shah | 428/349 |
| 5,491,019 | 2/1996 | Kuo | 428/213 |
| 5,523,136 | 6/1996 | Fischer et al. | 428/35.2 |
| 5,530,065 | 6/1996 | Farley et al. | 525/240 |
| 5,543,223 | 8/1996 | Shah | 428/349 |
| 5,558,930 | 9/1996 | DiPoto | 428/216 |
| 5,595,050 | 1/1997 | Koch et al. | 53/441 |
| 5,617,707 | 4/1997 | Simmons | 53/441 |

OTHER PUBLICATIONS

Product Literature, Dow Chemical Company, "ENGAGE Polyolefin Elastomer for Industrial Collation Packaging", KC 8852, May, 1994.

"Advantages of Metallocene Ethylene Polymer Resin Blends in Blown and Cast Films", Research Disclosure, Aug. 1995, pp. 565–573.

"Advantages of Metallocene Ethylene Polymer Resin Blends in Cast Film", Research Disclosure, Aug. 1995, pp. 556–557.

"Advantages of Metallocene Ethylene Polymer Resin Blends in Blown and Cast Stretch Films", Research Disclosure, Aug. 1995, pp. 539–545.

STRETCH WRAP FILMS

FIELD OF THE INVENTION

The present invention is directed to stretch wrap films and methods for their use. In particular, the present invention is directed to stretch wrap films having high puncture resistance, high elongation to break, high force to stretch the film, high cling force, and overall strength.

BACKGROUND OF THE INVENTION

The use of thermoplastic stretch wrap films for the overwrap packaging of goods, and in particular, the unitizing of palleted loads is a commercially significant application of polymer film, including generically, polyethylene. Overwrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Certain applications of stretch wrap films require that the film have superior cling characteristics in its applied stretched state and have superior slip characteristics when loaded beside other wrapped articles. These types of films are referred to as "cling/slip" films and are commonly used in the shipping of carpet and fabric rolls.

Some of the properties desired of a good stretch wrap film are as follows: good cling or cohesion properties of inside/outer surfaces, optional slip between outer layers, high puncture resistance, high tear resistance in the transverse direction, good machine direction tear resistance, good transparency, low haze, low stress relaxation with time, high resistance to transverse tear especially when under machine direction tension, producible in thin gauges, low specific gravity and thus high yield in area per pound, good tensile toughness, high machine direction ultimate tensile strength, high machine direction ultimate elongation, and low modulus of elasticity.

Physical properties which are particularly significant for the successful use of thermoplastic films in stretch wrap applications include their puncture resistance, their elongation characteristics, their toughness and their resistance to tearing while under tension. In general, tensile toughness is measured as an area under a stress-strain curve developed for a thermoplastic film and it may be considered as the tensile energy absorbed, expressed in units of ft. lbs./cu.in. to elongate a film to break under tensile load. In turn, this toughness characteristic is a function of the capacity of such films to elongate. The process of stretching the film decreases that capacity. Accordingly, the stretch wrap process will decrease the toughness of the film while it is in its stretched condition as an overwrap as compared to its unstretched form. Generally this loss of toughness is proportional to the amount of stretch imparted to the film as it is overwrapping a load of goods.

Currently, different grades of stretch wrap films are commonly marketed for different end uses according to overall film properties. For example, certain stretch wrap films having superior properties for load retention are characterized by requiring a higher force to stretch the film. However, such load retention films generally have poor puncture characteristics at such stretch conditions. On the other hand, certain stretch wrap films having superior puncture resistance properties have low load retention properties, thus limiting their use.

The present invention is beneficial in conjunction with applications, such as automated stretch wrappers that are designed for the high through-put segment of the market, that typically run in excess of 22 revolutions per minute. At these high speeds, many commercially available stretch films experience catastrophic failure due to the high strain rate.

A need exists for a superior stretch wrap film with high speed extensibility in the high speed market that will not have a catastrophic failure. A need exists to develop superior stretch wrap films characterized by having excellent load retention characteristics, puncture resistance characteristics, maximum stretch, inside to outer surface cling, and, if applicable, slip properties between outer layers and against other surfaces. Such films could be used in a wider variety of end applications and, thus, not unduly limit users of stretch wrap films to selectively choosing a film based on its properties prior to initiating a stretch wrap application.

SUMMARY OF THE INVENTION

The present invention is a multilayered film which has excellent cling, tear, load retention, maximum stretch and puncture resistance properties. The films of the present invention have improved these properties without undue degradation of other important film properties.

The stretch wrap film of the present invention is a multilayer film construction comprised of at least three layers and having at least one inner polymeric layer. The stretch wrap films of the present invention may be used in cling/cling and slip/cling film applications.

The inner polymeric layer of the inventive film comprises a blend of about 70 wt. % to about 98 wt. % of a low polydispersity polymer and about 2 wt. % to about 30 wt. % of a high pressure low density polyethylene resin (HPLDPE) and/or a very low density polyethylene resin (VLDPE). The low polydispersity polymer has a polydispersity of from about 1 to about 4, a melt index (MI), defined as the $I_2$ value, of from about 0.5 to about 10 g/10 min., and a melt flow ratio ($I_{20}/I_2$) of from about 12 to about 22. The low polydispersity polymer used to construct the inner polymeric layer is preferably produced utilizing metallocene catalyst polymerization techniques. The HPLDPE resin has a melt index of from about 1 to about 10 and a density of from about 0.9 to about 0.935 g/cm³, and the VLDPE resin has a melt index of from about 0.5 to about 5 g/10 min, and a density of from about 0.880 to about 0.912 g/cm³.

The inner polymeric layer may comprise additional resins with the above described resins. In addition, the multilayer film may be constructed with additional inner layers. For instance, additional inner polymeric layers may be incorporated adjacent to said first inner polymeric layer. The additional inner polymeric layer(s) are preferably constructed with the same or a different blend of metallocene-catalyzed polyethylene resins with the HPLDPE and/or VLDPE as the first inner polymeric layer.

The stretch wrap film of the present invention may include first and second layers. The first and second layers may be constructed of olefin polymer resins. These first and second layers are preferably constructed with a copolymer or a terpolymer of ethylene and a minor amount of at least one alpha olefin of from about 3 to about 12 carbon atoms. If the first and second layers are outer layers, then they have a cling force to each other of at least about 140 g/inch.

Additional layers may be incorporated in the stretch wrap film such as an outer high cling layer that may be located on an outer surface of the first layer or on an outer surface of the inner polymeric layer. The outer high cling layers are defined herein as layers having a cling force to each other of at least about 300 grams/inch. Additionally, an outer slip layer may be located on an opposing side of the outer high cling layer.

The multilayer films of the present invention have been found to display unexpectedly superior film properties compared to other film constructions, surprisingly without undue degradation of other important film properties. The incorporation of HPLDPE and/or VLDPE into the inner polymeric layer has produced an overall film having a F-50 dart drop value of at least about 150 g/mil and a maximum stretch of at least about 340%.

DETAILED DESCRIPTION OF THE INVENTION

Figure 1:
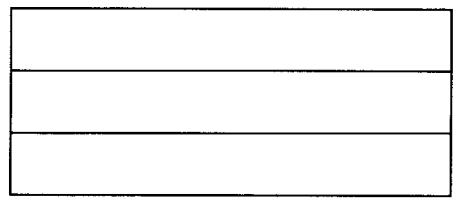
FIG. 1 shows a three layer cling/cling film constructed in accordance with the present invention.
Figure 2:
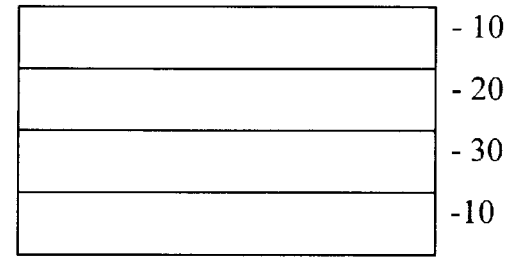
FIG. 2 shows a four layer cling/cling film constructed in accordance with the present invention.

The stretch wrap film of the present invention is a multilayer film construction comprising at least three layers and including at least one inner polymeric layer. These multilayer stretch wrap films can be prepared as cast films by conventional coextrusion techniques. The stretch wrap films of the present invention may be used in cling/cling and slip/cling film applications.

Inner Polymeric Layer

The multilayer stretch wrap films of the present invention are constructed with at least one inner polymeric layer. The inner polymeric layer may be a blend of a polymer having a low polydispersity and a HPLDPE resin. Alternatively, the inner polymeric layer may be a blend of a low polydispersity polymer and a VLDPE resin. Lastly, the inner polymeric layer may be a blend of a low polydispersity polymer and a HPLDPE resin and a VLDPE resin.

The low polydispersity polymer may be prepared from a partially crystalline polyethylene resin that is a polymer prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene.

The low polydispersity polymer generally has the characteristics associated with an LLDPE material, however it has improved properties as explained more fully below. The low polydispersity polymer defined herein has a density of from about 0.88 to about 0.94 g/cm³, preferably from about 0.88 to about 0.93 g/cm³, and more preferably from about 0.88 to about 0.925 g/cm³.

The average molecular weight of the low polydispersity polymer can generally range from about 20,000 to about 500,000, preferably from about 50,000 to about 200,000. The molecular weight is determined by commonly used techniques such as size exclusion chromatography or gel permeation chromatography. The low polydispersity polymer should have a molecular weight distribution, or polydispersity, ($M_w/M_n$, "MWD") within the range of about 1 to about 4, preferably about 1.5 to about 4, more preferably about 2 to about 4, and even more preferably from about 2 to about 3. The ratio of the third moment to the second moment, $M_z/M_w$, is generally below about 2.3, preferably below about 2.0, and more typically in the range of from about 1.6 to about 1.95. The melt flow ratio (MFR) of these polymers, defined as $I_{20}/I_2$ and as determined in accordance to ASTM D1238, is generally from about 12 to about 22, preferably from about 14 to about 20, and more preferably from about 16 to about 18. The melt index (MI), defined as the $I_2$ value, should be in the range of from about 0.5 to about 10 g/10 min., preferably from about 1 to about 5 g/10 min. as determined by ASTM D1238.

Useful low polydispersity polymers are available from, among others, Dow Chemical Company and Exxon Chemical Company who are producers of single site or constrained geometry catalyzed polyethylenes. These polymers are commercially available as the AFFINITY and EXXACT polyethylenes (see *Plastics World,* p.33–36, Jan. 1995), and also as the ENHANCED POLYETHYLENE and EXCEED line of resins. The manufacture of such polyethylenes, generally by way of employing a metallocene catalyst system, is set forth in, among others, U.S. Pat. Nos. 5,382,631, 5,380,810, 5,358,792, 5,206,075, 5,183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is incorporated herein by reference in its entirety. These catalyst systems and their use to prepare such copolymer materials are also set forth in EP 0 600 425 A1 and PCT applications WO 94/25271 and 94/26816. The low polyethylene polymers thus produced generally have a crystalline content in excess of at least 10 weight percent, generally in excess of at least 15 weight percent.

The above patents and publications generally report that these catalysts contain one or more cyclopentadienyl moieties in combination with a transition metal. The metallocene catalyst may be represented by the general formula $C_cMA_aB_b$ wherein C is a substituted or unsubstituted cyclopentadienyl ring; M is a Group 3–10 metal or Lanthanide series element, generally a Group IVB, VB, or VIB metal; A and B are independently halogen, hydrocarbyl group, or hydrocarboxyl groups having 1–20 carbon atoms; a=0–3, b=0–3, and c=1–3. The reactions can take place in either gas phase, high pressure, slurry, or solution polymerization schemes.

According to one embodiment, at least one of the inner polymeric layer comprises a low polydispersity polymer which is blended with a HPLDPE resin. The HPLDPE resins have a density of from about 0.9 to about 0.935 g/cm³ and preferably a density of from about 0.915 to about 0.925 g/cm³. The HPLDPE resins have a melt index ($I_2$) of from about 0.5 to about 10, preferably from about 1 to about 5, and most preferably from about 1 to about 2.5 g/10 min. The HPLDPE resins comprise from about 2 to about 30 wt. % of the inner polymeric layer with the preferred range of from about 5 to about 15 wt. % of the inner polymeric layer. It is preferred to maintain the level of the low polydispersity polymer to at least 70 weight percent of the inner polymeric layer. Additional, material may be incorporated with the blend of the low polydispersity polymer and the HPLDPE resin.

Alternatively, the inner polymeric layer of the present invention comprises a blend of a low polydispersity polymer and a VLDPE resin. The VLDPE resins have a density ranging from about 0.880 to about 0.912 g/cm³, more commonly from about 0.89 to about 0.91 g/cm³, and a melt index ($I_2$) of from about 0.5 to about 5 g/10 min., and preferably from about 1 to about 3 g/10 min. The VLDPE comprises from about 2 to about 30 wt. % of the inner polymeric layer with the preferred range of from about 15 to about 25 wt. % of the inner polymeric layer. It is preferred to maintain the level of the low polydispersity polymer to at least 70 weight percent of the inner polymeric layer. Additional materials may be incorporated with the blend of the low polydispersity polymer and the VLDPE resin.

According to another embodiment, the inner polymeric layer(s) comprises a blend of a low polydispersity polymer with the above described HPLDPE resins and VLDPE resins.

The inner polymeric layer(s) are preferably at least about 60 wt. % of the stretch wrap film and preferably at least about 70 wt. % of the stretch wrap film.

First and Second Layers

The present invention may include first and second layers. The first and second layers of the stretch wrap films of the present invention may be constructed of olefin polymer resins. Suitable polyethylene resins are those ethylenic copolymers that comprise a major proportion by weight of ethylene copolymerized with a minor proportion by weight of an alpha olefin monomer containing about 3 to about 12, preferably about 4 to about 10, and more preferably about 4 to about 8, carbon atoms. These resins have a polydispersity which is preferably in the range of from about 3 to about 7.

Ethylenic copolymers may be those commonly referred to as linear low density polyethylenes (LLDPE). Preferably the ethylenic copolymers employed are those having from about 1 to about 20, preferably from about 1 to about 10 weight percent of said higher alpha olefin monomer copolymerized therein. In addition, the alpha olefin monomer employed in the ethylenic copolymer may be selected from the group consisting of 1-butene, 3-methyl-1-butene, 3-methyl-1-pentene, 1-hexene, 4-methyl-1-pentene, 3-methyl-1-hexene, 1-octene and 1-decene. Particularly preferred are the 1-hexene alpha olefins. The LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

The polyethylene resins that are desired to be used as the first and second layers in films of the present invention are those that are functionally defined as providing a cling force of at least about 140, generally at least about 180, preferably at least about 200, and more preferably about 220 grams/inch as determined by the ASTM D 5458-94 test as long as the first and second layers are the outer layers. Generally, the cling force of the outer first and second layers will be in the range of from about 140 to about 280 grams/inch. Common LLDPE resins that can be used to form the first and second layers include those having a relatively high weight percentage of n-hexane extractables, as measured by the n-hexane extractables method of 21 C.F.R. 177.1520. Generally, the LLDPE used in the first and second layers herein will contain from about 2 to about 10, preferably from about 2 to about 8, more preferably from about 2.5 to about 5, weight percent of n-hexane extractables.

The LLDPE resins that can be used in the first and second layers herein have a density ranging from about 0.890 to about 0.940 g/cm³, more commonly from about 0.90 to about 0.93 g/cm³, and a melt index ($I_2$) of from about 1 to about 10 g/10 min. as determined by ASTM D1238. Particularly preferred are those LLDPE resins possessing densities within the range of from about 0.915 to about 0.920 g/cm³ and a melt index within the range of from about 2.0 to about 5.0 g/10 min. as determined by ASTM D1238. Examples of such LLDPE resins include those set forth in U.S. Pat. No. 5,273,809, which is incorporated herein by reference in its entirety.

The LLDPE resins that can be used in the first and second layers can be blended with minor amounts, e.g., up to about 40 weight percent total, of one or more other suitable resins to achieve a desired range of physical/mechanical properties in the film product. Thus, for example, such resins as ethyl vinyl acetate (EVA) copolymer, high pressure low density polyethylene (HPLDPE), and other LLDPE resins may be used for blending to obtain useful mixtures for forming the first and second layers of the films of this invention.

The LLDPE resins that can be used in the first and second layers herein can also contain known and conventional cling additives to augment the cling property that, at least in the case of the particularly preferred resins, is inherently exhibited. Examples of useful cling additives include polyisobutylenes having a number average molecular weight in the range from about 1,000 to about 3,000, preferably about 1,200 to about 1,800, as measured by vapor phase osmometry, amorphous atactic polypropylenes, e.g., those having an average molecular weight of about 2000, and polyterpenes and ethylene-vinyl acetate copolymers containing from about 5 to about 15 weight percent copolymerized vinyl acetate. The optional cling additive may be present in the first and second layers in a concentration of from about 0.5 to about 10 weight percent of the resin. Of course, other conventional film additives such as antioxidants, UV stabilizers, pigments, dyes, etc., may be present in the usual amounts.

It is preferred to utilize the LLDPE resins that contain relatively high weight percentages of n-hexane extractables for both the first and second layers due to overall performance results. However, one or both of the first and second layers may comprise, for example, a first ethylene monomer and a second monomer that comprises an acrylate. On example is an ethylene-acrylate (EA) polymer film shown in U.S. Pat. No. 5,049,423, which is incorporated herein by reference in its entirety. These EA polymers generally have an acrylate content between about 2 to about 40%, preferably between about 10 to about 35%, by weight of the EA polymer. The acrylate useful in these polymers are those generally known in the art, preferably methyl, ethyl, and n-butyl acrylate. Other known cling layers are contemplated for the present invention.

Either or both of the outer surfaces of the first and second layers can be treated by such known and conventional post-forming operations as corona discharge, chemical treatment, flame treatment, etc., to modify the printability or ink receptivity of the surface(s) or to impart other desirable characteristics thereto.

Additional Layers

Additional layers are contemplated in the stretch wrap film of the present invention. For example, the stretch wrap film may comprise an outer high cling layer. The outer high cling layer may be located on an outer surface of a first layer or on an outer surface of an inner polymeric layer. The outer high cling layer provides a cling force of at least about 300 grams/inch as determined by the ASTM D5458-94 test method. Preferably, the outer high cling layer provides a cling force of at least about 350 grams/inch and is constructed in a manner similar to that described above with the first and second layers. The outer high cling layer will typically be a pure resin in order to obtain the higher cling forces. Some examples of high cling resins are resins such as EA polymers discussed above and very low density polyethylenes (VLDPE). The VLDPE resins typically have a density of from about 0.88 to about 0.912 g/cm$^3$ and preferably from about 0.89 to about to about 0.91 g/cm$^3$, and a melt index (I$_2$) of from about 0.5 to about 5 g/10 min. and preferably from about 1 to about 3 g/10 min.

The stretch wrap film of the present invention may also comprise an outer slip layer which may be constructed of various resin materials suitable for such purposes. Examples of such resins include polyolefin resins and copolymers of polyolefins such as polyethylene, polypropylene, and combinations thereof. Suitable polymer resins additionally include copolymers of polyethylene with minor amounts of other C$_{4-10}$ olefins, particularly C$_{6-8}$ polyolefins. Preferred polyethylenes include HPLDPE resins having a density of from about 0.92 to about 0.94 g/cm$^3$, and a melt index (I$_2$) of from about 1.0 to about 4.0 g/10 min., and LLDPE resins having a density of from about 0.925 to about 0.945 g/cm$^3$, and a melt index of from about 2.0 to about 5.0 g/10 min. Preferred polymers include polypropylenes, preferably isotactic, having a density of from about 0.89 to about 0.91 g/cm$^3$, and a melt index (I$_2$) of from about 5 to about 25 g/10 min. as determined by ASTM D1238.

The outer slip layer may include any of several anticling, slip or antiblock additives to improve the slip characteristics of the layer. Such additives include silicas, talcs, diatomaceous earth, silicates, lubricants, etc. These additives are generally blended with the resin material in an amount of from about 100 to about 20,000 ppm. When an outer slip layer is present in the stretch wrap film, an outer high cling layer as described above will be located as an opposing layer.

Additionally interior layers are also contemplated in the present invention to provide barrier properties or cost reductions.

The stretch wrap films of the present invention can be constructed to contain a plurality of layers of the film in various combinations. According to one embodiment, the stretch wrap film is of an A/BC/A construction (see FIG. 1) wherein the film layers (10) are the first and second layers (layers A), film layer (20) is the inner polymeric layer which comprises a blend of a low polydispersity polymer (resin B) and either a HPLDPE resin, a VLDPE resin, or a combination thereof (resins C). According to another embodiment, the stretch wrap film is an A/BC/BC/A construction wherein film layers (10) and (20) are the same as described above and film layer (30) comprises a blend of resins B and C. The inner polymeric layers (20,30) may be constructed with the same resins or with different resins to obtain the desired properties of the multilayer film.

Figure 3:
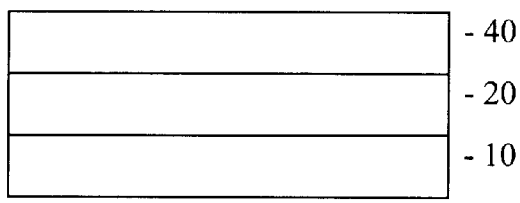
FIG. 3 shows a three layer high cling/cling film constructed in accordance with the present invention.
Figure 4:
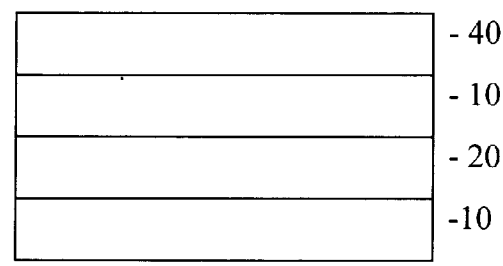
FIG. 4 shows a four layer high cling/cling film constructed in accordance with the present invention.
Figure 5:
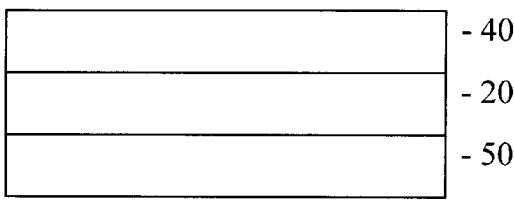
FIG. 5 shows a three layer high cling/slip film constructed in accordance with the present invention.
Figure 6:
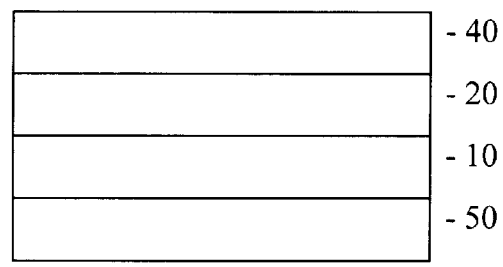
FIG. 6 shows a four layer high cling/slip film constructed in accordance with the present invention.

Other types of multi-layered constructions are contemplated such as a D/BC/A construction and a D/A/BC/A construction depicted in respective FIGS. 3 and 4 where film layer (40) is an outer high cling layer (layer D). In addition, a D/BC/E construction and a D//BC/A/E construction are contemplated and depicted in respective FIGS. 5 and 6 where film layer (50) is an outer slip layer (layer E).

Stretch Wrap Properties

The overall properties of the stretch wrap films of the present invention are such that they have a cling force of at least about 140, generally at least about 180, preferably at least about 200, and more preferably at least about 220 grams/inch as determined by ASTM D5458-94. Generally, the cling force of the film will be in the range of from about 140 to about 280 g/inch. However, if an outer high cling layer is used the film, the cling force will be generally in the range of from about 300 to about 350 g/inch as determined by ASTM D5458-94.

The overall stretch wrap films have relatively high puncture resistance, as measured by the F-50 dart drop test procedure (ASTM D1709). It is the experience of those skilled in the art that the F-50 dart drop test is well correlated to the end use puncture resistance of stretch wrap films. The F-50 dart drop of the stretch wrap films is at least about 150 g/mil, preferably at least about 200 g/mil, and more preferably from at least about 250 g/mil.

The stretch wrap films of the present invention are preferably constructed so that the overall transverse direction tear resistance (TD tear), as determined by ASTM D1922, is at least about 450 g/mil, preferably at least about 500 g/mil, more preferably at least about 550 g/mil. The machine direction tear resistance (MD tear) of the film is generally at least about 100 g/mil, preferably at least about 150 g/mil, and more preferably at least about 175 g/mil.

A parameter used to analyze the performance of stretch wrap films is the stress that results when the film is stretched to a desired percentage of its original length. This stress is indicative of the load retention characteristics of the film and is determined in accordance with ASTM D882. The films of the present invention generally have a stress level at 200% elongation of at least about 1700 psi, preferably at least about 1850 psi, and more preferably at least about 2000 psi. The films of the present invention generally have a stress level at 250% elongation of at least about 1800 psi, preferably at least about 1950 psi, more preferably at least about 2100 psi.

The stretch wrap film of this invention can, if desired, be provided in the non-stretched, i.e., unoriented, or at most only modestly stretched, state prior to use. The films of the present invention are capable of being stretched from at least about 340%, preferably at least about 370% and more preferably at least about 400%.

The multilayer films of the present invention exhibit improved outer/outer film slip characteristics. The slip properties of the films are reported as coefficient of friction (COF) values in accordance with ASTM-D1894. The films generally have a kinetic COF value of below about 1.0, preferably below about 0.8, and more preferably below about 0.6.

The films of the present invention generally have a gloss of at least about 88% and a haze of below about 2%.

The film configurations are constructed according to conventional practices. One preferred processing technique is to coextrude and cast the films in a simultaneous fashion, however in some cases it may be appropriate to first coextrude at least two film layers and thereafter extrusion coat the remaining film layers. Conventional techniques of coextrusion may be employed to assemble the composite structures of the films of this invention. Reference may be made to U.S. Pat. No. 3,748,962, the contents of which are incorporated herein by reference in its entirety, for details of a coextrusion procedure which can be employed in the fabrication of a multilayer film in accordance with this invention.

Generally, the resin materials are heated to their molten state and their viscosities are coordinated to prepare multilayer films in a uniform manner. The molten materials are conveyed to a coextrusion adapter that combines the molten materials to form a multilayer coextruded structure. The layered polymeric material is transferred through an extrusion die opened to a predetermined gap commonly in the range of between about 0.05 in. (0.13 cm) and about 0.012 in. (0.03 cm). The material is then drawn down to the intended gauge thickness by means of a primary chill or casting roll maintained at about 60 to about 130° F. (15–55° C.). Typical draw down ratios range from about 5:1 to about 40:1.

The overall thickness of the stretch wrap film can vary widely according to end use specifications, but is generally in the range of the typical thicknesses for stretch wrap films. Conventional for such films is a thickness of from about 0.4 to about 3 mils, and is application specific.

The pallet unitizing techniques described in U.S. Pat. Nos. 3,986,611 and 4,050,221 are contemplated herein. The disclosures of these patents are incorporated herein by reference in their entirety.

EXAMPLES

The following examples were conducted to demonstrate various aspects of the multilayer films of the present invention. The procedures utilized in the following examples are set forth in Table 1.

TABLE 1

STRETCH FILM TEST PROCEDURES

| TEST PROCEDURE | ASTM TEST METHOD |
| --- | --- |
| Tensile Yield Machine Direction (MD) | D882 |
| Tensile Ultimate MD | D882 |
| Tensile Elongation MD | D882 |
| Tensile Force @ 200% Stretch | D882 |
| 250% Stretch | D882 |
| 300% Stretch | D882 |
| 350% Stretch | D882 |
| Elmendorf Tear MD | D1922 |
| Elmendorf Tear Transverse Direction (TD) | D1922 |
| Total Energy Dart Drop | D4272 |
| F-50 Dart Drop | D1709 |
| Gardner Gloss | D2457 |
| Gardner Haze | D1003 |
| Coefficient of Friction | D1894 |
| Instron Peel Cling | D5458 |
| Instron Probe Puncture Energy | — |

The probe puncture energy test was conducted by use of an Instron Universal tester that records a continuous reading of the force (stress) and penetration (strain) curve. A 6 in. by 6 in. film specimen is securely mounted to a compression load cell to expose a 4 in. by 4 in. area. A hemispherically shaped (1 in. dia.) stainless steel probe, traveling at a constant speed of 10 in./min. is lowered into the film. A stress/strain curve is recorded and plotted. Peak force is the maximum force encountered. The machine is used to integrate the area under the curve, which is indicative of the energy consumed during the penetration to rupture testing of the film. The probe penetration was also recorded in this test.

The films were also tested for performance in a stretch wrapper to determine various film properties that occur during the stretching operation. The testing was conducted at rates similar to those employed by commercial equipment. The film width was 20 inches for this test machine. The machine direction (MD) force at 200%, and maximum stretch and force values at breakage, were determined.

The films of the Examples were prepared using a pilot scale commercial cast film line machine. The material melt temperatures ranged from about 480 to about 580° F. and were chosen to match melt viscosities of the various resins. The melts were conveyed to a coextrusion adapter that combines the melt flows into a multilayer coextruded structure. This layered flow was distributed through a single manifold film extrusion die to the required width. The die gap opening was nominally 0.025 inches. The material was drawn down to the final gauge. The material draw down ratio was about 31:1 for the 0.8 mil films. A vacuum box was used to pin the melt exiting the die opening to a primary chill roll maintained at about 90° F.

EXAMPLES

The results of the tests appear in Tables 2 and 3. Specifically, Table 2 illustrates comparative films 1–5 and cling-cling inventive films 6–11, while Table 3 illustrates comparative films 1–5 and cling-slip inventive films 12–14. The inventive films were all coextuded in a three layered embodiment of either an A/BC/A construction (films 6–11) or an A/BC/D construction (films 12–14).

Referring to Table 2, the first and second layers (layers A) of the inventive films 6–11 comprised a 3.3 melt index (MI) linear low density polyethylene ("LLDPE") resin having a density of 0.918 g/cm$^3$. The inner polymeric layer (layer BC) of the inventive films 6–11 comprised a homogeneous blend of resin B and resin C. Resin B of the inner polymeric layer of each inventive film comprised a 100% metallocene-catalyzed low polydispersity polymer. Specifically, resin B comprised a metallocene-catalyzed 3.4 LLDPE ("mLLDPE") resin having a density of 0.918 g/cm³ that was prepared with a 1-hexene copolymer. In inventive films 6–8, resin C comprised a 1.9 MI high pressure, low density polyethylene ("HPLDPE") resin having a density of 0.921 g/cm³. However, in inventive films 9–11, resin C comprised a 3.3 MI HPLDPE resin having a density of 0.923 g/cm³.

Referring to Table 3, inventive films 12–14 were constructed in a three layer embodiment of A/BC/D. An outer high cling layer (layer A) of inventive films 12–14 comprised a 5.0 MI ethylene-acrylate (EA) copolymer having a density of 0.945 g/cm (see "EA Copoly" in Table 3). The inner polymeric layer (layer BC) of inventive films 12–14 comprised a homogenous blend of resin B and resin C. Resin B comprised a 3.4 MI mLLDPE resin having a density of 0.918 g/cm³ and resin C comprised a 3.3 MI HPLDPE resin having a density of 0.923 g/cm³. Layer D comprised a 4.0 MI LLDPE resin having a density of 0.940 g/cm³.

Comparative film 1 was comprised entirely of a 3.3 MI LLDPE having a density of 0.918 g/cm³. Comparative films 2 and 3 were comprised entirely of a resin B. Specifically, comparative film 2 comprised a 3.4 MI mLLDPE having a density of 0.918 g/cm³, and comparative film 3 comprised a 2.5 mLLDPE having a density of 0.917 g/cm³.

Comparative films 4 and 5 were comprised of an A/B/A construction. Comparative film 4 included a first and a second layer (layers A) comprised of a 3.3 MI LLDPE having a density of 0.918 g/cm³ and an inner polymeric layer (layer B) comprised of 2.35 MI LLDPE having a density of 0.9175 g/cm³. Comparative film 5 included a first and second layer (layers A) comprised of a 3.3 MI LLDPE having a density of 0.918 g/cm³ and an inner polymeric layer (layer B) comprised of 3.4 MI mLLDPE having a density of 0.918 g/cm³.

The compositions of each layer are shown as a total percent of all the layers. For example, in Table 2, layer A comprised about 20 wt. % of the stretch wrap film in inventive film 6, in which each of the first and second layers were approximately 10 wt. % of the stretch wrap film. However, the proportions of the first and second layers (layers A) of the inventive films do not necessarily need to be equal. All of the inventive films (films 6–14), as well as the comparative films (films 1–5), were constructed at the same gauge of about 0.8 mil.

Referring specifically to Table 2, inventive films 6–11 showed significant improvement in maximum stretch % over comparative films 2, 3 and 5. Inventive films showed an improvement in maximum stretch % over comparative films 1 and 4. These improvements in maximum stretch % in the inventive films 6–11 as compared to the comparative films 1–5 were unexpected. Inventive films 6–11 showed a slight improvement in cling properties (see "unstretched cling I/O [inside/outside]") over comparative films 1, 4 and 5 and showed a great improvement over comparative films 2 and 3.

All of the inventive films (films 6–11) in Table 2 had a good transverse directional tear resistance (TD tear) relative to the machine directional tear resistance (MD tear). It is important to have a good TD tear relative to a MD tear under stretched conditions. Without this balance of MD and TD tear, the film catastrophically fails if any defect is present. Generally speaking, the TD tear of a stretch wrap film should have a value about two times greater than the MD tear and preferably about three times greater than the MD Tear. As shown in Table 2, comparative films 2, 3 and 5 do not have good TD tear to MD tear ratios.

The inventive films 6–11 exhibited a much better puncture resistance, as measured by the F-50 dart drop test, than the comparative films 1 and 4. The inventive films 6–11 had a lower puncture resistance than the comparative films 2, 3 and 5. However, comparative films 2 and 3 with a single layer of metallocene-catalyzed LLDPE are not desirable for use as stretch wrap film due to their poor cling performance, low TD tear relative to the MD tear, and poor maximum stretch values. As discussed above, comparative film 5 does not have a good TD tear relative to MD tear and a good maximum stretch %.

Referring to Table 3, the inventive films 12–14 showed similar improvements as the inventive films 6–11 when compared to the comparative films 1–5. Inventive films 12–14 showed an excellent maximum stretch %, TD tear to MD tear ratio, cling properties and puncture resistance as measured by the F-50 dart drop test.

TABLE 2

| | Comparative Films | | | | | Inventive Films | | | | | |
|---|---|---|---|---|---|---|---|---|---|---|---|
| | SAMPLE No. | | | | | | | | | | |
| | 1 | 2 | 3 | 4 | 5 | 6 | 7 | 8 | 9 | 10 | 11 |
| Average Gauge (mils) | 0.80 | 0.80 | 0.80 | 0.80 | 0.80 | 0.80 | 0.80 | 0.80 | 0.80 | 0.80 | 0.80 |
| Layer Configuration | A | B | B | A/B/A | A/B/A | A/BC/A | A/BC/A | A/BC/A | A/BC/A | A/BC/A | A/BC/A |
| Resin "A" wt. % | 100 | 0 | 0 | 20 | 20 | 20 | 20 | 20 | 20 | 20 | 20 |
| Resin "B" wt. % | 0 | 100 | 100 | 80 | 80 | 76 | 72 | 64 | 76 | 72 | 64 |
| Resin "C" wt. % | 0 | 0 | 0 | 0 | 0 | 4 | 8 | 16 | 4 | 8 | 16 |
| Resin "A" Resin | 3.3 MI LLDPE | | | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE |
| Resin "B" Resin | | 3.4 MI mLLDPE | 2.5 MI mLLDPE | 2.35 MI LLDPE | 3.4 MI mLLDPE | 3.4 MI mLLDPE | 3.4 MI mLLDPE | 3.4 MI mLLDPE | 3.4 MI mLLDPE | 3.4 MI mLLDPE | 3.4 MI mLLDPE |
| Resin "C" Resin | | | | | | 1.9 MI HPLDPE | 1.9 MI HPLDPE | 1.9 MI HPLDPE | 3.3 MI HPLDPE | 3.3 MI HPLDPE | 3.3 MI HPLDPE |
| LAB ANALYSIS | | | | | | | | | | | |
| MD Ultimate (psi) | 5,051.0 | 8,441.0 | 8,608.0 | 5,876.0 | 6,984.0 | 6,259.0 | 5,421.0 | 5,720.0 | 6,565.0 | 5,572.0 | 5,208.0 |
| MD Elongation | 588.0 | 579.0 | 630.0 | 580.0 | 639.0 | 620.0 | 585.0 | 599.0 | 645.0 | 605.0 | 601.0 |

TABLE 2-continued

|  | Comparative Films | | | | | Inventive Films | | | | | |
|---|---|---|---|---|---|---|---|---|---|---|---|
|  | SAMPLE No. | | | | | | | | | | |
|  | 1 | 2 | 3 | 4 | 5 | 6 | 7 | 8 | 9 | 10 | 11 |
| (%) | | | | | | | | | | | |
| MD Stress @ 200% (psi) | 1,596.0 | 1,655.0 | 1,701.0 | 1,619.0 | 1,586.0 | 1,702.0 | 1,819.0 | 2,107.0 | 1,720.0 | 1,843.0 | 2,051.0 |
| MD Stress @ 250% (psi) | 1,633.0 | N.A. | N.A. | 1,676.0 | 1,689.0 | 1,781.0 | 1,908.0 | 2,214.0 | 1,786.0 | 1,914.0 | 2,125.0 |
| MD Stress @ 300% (psi) | 1,712.0 | N.A. | N.A. | 1,839.0 | 1,887.0 | 2,004.0 | 2,112.0 | 2,428.0 | 2,001.0 | 2,112.0 | 2,307.0 |
| MD Stress @ 350% (psi) | 2,025.0 | N.A. | N.A. | 2,176.0 | 2,156.0 | 2,275.0 | 2,395.0 | 2,720.0 | 2,250.0 | 2,353.0 | 2,545.0 |
| MD Tear (grams/mil) | 266 | 378 | 353 | 254 | 359 | 292 | 239 | 111 | 289 | 220 | 130 |
| TD Tear (grams/mil) | 768 | 557 | 491 | 728 | 542 | 652 | 675 | 744 | 635 | 633 | 699 |
| Probe Punct. Energy (in-lbs) | 9.9 | 13.3 | 14.2 | 12.7 | 20.5 | 12.3 | 17.6 | 14.8 | 14.2 | 14.0 | 14.3 |
| Probe Penetration (in) | 3.8 | 4.1 | 4.2 | 4.2 | N.A. | 3.8 | 3.9 | 4.1 | 4.2 | 4.2 | 4.2 |
| F-50 Dart Drop (g/mil) | 122 | 611 | 792 | 156 | 496 | 499 | 390 | 341 | 483 | 416 | 315 |
| Unstretched Cling I/O (g/in) | 238.1 | 86.6 | 80.5 | 230.6 | 234.9 | 255.8 | 250.7 | 262.2 | 264.8 | 266.8 | 282.3 |
| Film Gloss % | 92.6 | 89.5 | 88.2 | 91.9 | 88.3 | 92.7 | 92.4 | 91.9 | 91.6 | 91.4 | 91.4 |
| Film Haze % | 1.76 | 2.60 | 2.18 | 1.55 | 2.06 | 1.55 | 1.57 | 1.58 | 1.68 | 1.61 | 1.53 |
| STRETCH WRAP TESTER | | | | | | | | | | | |
| MD Force @ 200% (lbs/in) | 2.14 | 1.95 | 1.85 | 1.76 | 2.15 | 1.95 | 2.13 | 2.31 | 1.99 | 2.00 | 2.35 |
| Maximum Force (lbs/in) | 2.67 | 2.21 | 2.28 | 2.32 | 2.41 | 2.64 | 2.84 | 2.97 | 2.60 | 2.73 | 2.97 |
| Maximum Stretch % | 396 | 345 | 341 | 380 | 341 | 392 | 414 | 430 | 395 | 420 | 463 |
| Defects/1500' @ 300% Stretch | 78 | 6 | N.A. | 52 | N.A. | 2 | 6 | 10 | 1 | 0 | 2 |
| HS Tst F-50 Pot Setting | W.N.R. | 3.11 | N.A. | 0.80 | N.A. | 2.25 | 2.35 | 1.65 | 3.30 | 1.00 | 2.05 |
| HS Tst No Fail Pot Setting | N.A. | 2.00 | N.A. | 0.00 | N.A. | 1.50 | 1.50 | 1.00 | 2.50 | 0.50 | 1.50 |

TABLE 3

|  | Comparative Films | | | | | Inventive Films | | |
|---|---|---|---|---|---|---|---|---|
|  | SAMPLE No. | | | | | | | |
|  | 1 | 2 | 3 | 4 | 5 | 12 | 13 | 14 |
| Average Gauge (mils) | 0.80 | 0.80 | 0.80 | 0.80 | 0.80 | 0.80 | 0.80 | 0.80 |
| Layer Configuration | A | B | B | A/B/A | A/B/A | A/BC/D | A/BC/D | A/BC/D |
| Resin "A" wt. % | 100 | 0 | 0 | 20 | 20.0 | 10 | 10 | 10 |
| Resin "B" wt. % | 0 | 100 | 100 | 80 | 80.0 | 71.25 | 67.5 | 60 |
| Resin "C" wt. % | 0 | 0 | 0 | 0 | 0 | 3.75 | 7.5 | 15 |
| Resin "D" wt. % | 0 | 0 | 0 | 0 | 0 | 15 | 15 | 15 |
| Resin "A" Resin | 3.3 MI LLDPE |  |  | 3.3 MI LLDPE | 3.3 MI LLDPE | 5 MI EA Copoly | 5 MI EA Copoly | 5 MI EA Copoly |
| Resin "B" Resin |  | 3.4 MI mLLDPE | 2.5 MI mLLDPE | 2.35 MI LLDPE | 3.4 MI mLLDPE | 3.4 MI mLLDPE | 3.4 MI mLLDPE | 3.4 MI mLLDPE |
| Resin "C" Resin |  |  |  |  |  | 3.3 MI HPLDPE | 3.3 MI HPLDPE | 3.3 MI HPLDPE |
| Layer "D" Resin |  |  |  |  |  | 0.940 g/cm³ LLDPE | 0.940 g/cm³ LLDPE | 0.940 g/cm³ LLDPE |
| LAB ANALYSIS | | | | | | | | |
| MD Ultimate (psi) | 5,051.0 | 8,441.0 | 8,608.0 | 5,876.0 | 6,984.0 | 4,677.0 | 4,092.0 | 4,709.0 |
| MD Elongation (%) | 588.0 | 579.0 | 630.0 | 580.0 | 639.0 | 596.0 | 555.0 | 580.0 |
| MD Stress @ 200% (psi) | 1,596.0 | 1,655.0 | 1,701.0 | 1,619.0 | 1,586.0 | 1,743.0 | 1,871.0 | 2,248.0 |
| MD Stress @ 250% (psi) | 1,633.0 | N.A. | N.A. | 1,676.0 | 1,689.0 | 1,805.0 | 1,934.0 | 2,323.0 |
| MD Stress @ 300% (psi) | 1,712.0 | N.A. | N.A. | 1,839.0 | 1,887.0 | 1,973.0 | 2,088.0 | 2,474.0 |
| MD Stress @ 350% (psi) | 2,025.0 | N.A. | N.A. | 2,176.0 | 2,156.0 | 2,188.0 | 2,316.0 | 2,700.0 |
| MD Tear (grams/mil) | 266 | 378 | 353 | 254 | 359 | 226 | 179 | 105 |

TABLE 3-continued

|  | Comparative Films | | | | | Inventive Films | | |
|---|---|---|---|---|---|---|---|---|
|  | SAMPLE No. | | | | | | | |
|  | 1 | 2 | 3 | 4 | 5 | 12 | 13 | 14 |
| TD Tear (grams/mil) | 768 | 557 | 492 | 728 | 542 | 579 | 567 | 524 |
| Probe -Punct. Energy (in-lbs) | 9.9 | 13.3 | 14.2 | 12.7 | 20.5 | 17.8 | 18.5 | 16.6 |
| Probe Penetration (in) | 3.8 | 4.1 | 4.2 | 4.2 | N.A. | 4.5 | 4.6 | 4.2 |
| F-50 Dart Drop (g/mil) | 122 | 611 | 792 | 156 | 496 | 474 | 479 | 270 |
| Unstretched Cling I/O (g/in) | 238.1 | 86.6 | 80.5 | 230.6 | 234.9 | 372.6 | 339.0 | 352.7 |
| Film Gloss % | 92.6 | 89.5 | 88.2 | 91.9 | 88.3 | 82.4 | 81.8 | 82.3 |
| Film Haze % | 1.76 | 2.60 | 2.18 | 1.55 | 2.06 | 2.96 | 2.95 | 3.02 |
| STRETCH WRAP TESTER | | | | | | | | |
| MD Force @ 200% (lbs/in) | 2.14 | 1.95 | 1.85 | 1.76 | 2.15 | 2.09 | 2.28 | 2.70 |
| Maximum Force (lbs/in) | 2.67 | 2.21 | 2.28 | 2.32 | 2.41 | 2.60 | 2.54 | 2.95 |
| Maximum Stretch % | 396 | 345 | 341 | 380 | 341.0 | 417 | 351 | 490 |
| Defects/1500' @ 300% Stretch | 78 | 6 | N.A. | 52 | N.A. | 26 | 19 | 6 |
| HS Tst F-50 Pot Setting | W.N.R. | 3.11 | N.A. | 0.80 | N.A. | N.A. | N.A. | N.A. |
| HS Tst No Fail Pot Setting | N.A. | 2.00 | N.A. | 0.00 | N.A. | N.A. | N.A. | N.A. |

What is claimed is:

1. A method for wrapping an article, comprising:
   wrapping the article with a multilayer, thermoplastic stretch wrap film containing at least three polymeric film layers, said film comprising
   (a) a first layer comprising a polymer of two or more monomers, wherein the first monomer is ethylene, in a major amount by weight, and the second monomer is an alpha olefin of from about 3 to about 12 carbon atoms, in a minor amount by weight;
   (b) a second layer comprising a polymer of two or more monomers, wherein the first monomer is ethylene, in a major amount by weight, and the second monomer is an alpha olefin of from about 3 to about 12 carbon atoms, in a minor amount by weight, at least one of said first layer and said second layer has sufficient cling resulting from inherent cling alone, cling additive or a combination thereof so as to produce a cling force to the other layer of at least about 140 grams/inch as determined by ASTM D5458-94; and
   (c) at least one inner polymeric layer, located between said first layer and said second layer, comprising a blend of a low polydispersity polymer and either a high pressure low density polyethylene resin, a very low density polyethylene resin or combinations thereof, said low polydispersity polymer having a polydispersity of from about 1 to about 4, a melt index ($I_2$) of from about 0.5 to about 10 g/10 min., a melt flow ratio ($I_{20}/I_2$) of from about 12 to about 22 and comprising at least about 70 wt. % of the total amount of said inner polymeric layer(s), said high pressure low density polyethylene resin having a melt index ($I_2$) of from about 1 to about 10 g/10 min. and a density of from about 0.9 to about 0.935 g/cm$^3$, said very low density polyethylene resin having a melt index ($I_2$) of from about 0.5 to about 5 g/10 min, and a density of from about 0.880 to about 0.912 g/cm$^3$;
   so as to produce a stretch wrap film having a maximum stretch of at least 340%, and an F-50 dart drop value of at least about 150 g/mil as determined by ASTM D1709, and
   whereby said stretch wrap film is stretched during the wrapping step.

2. The method of claim 1 wherein said stretch wrap film comprises at least about 60 wt. % of the total amount of said inner polymeric layer(s).

3. The method of claim 2 wherein said stretch wrap film comprises at least about 70 wt. % of the total amount of said inner polymeric layer(s).

4. The method of claim 1 wherein said polydispersity is in the range of from about 1.5 to about 4.

5. The method of claim 4 wherein said polydispersity is in the range of from about 2 to about 4.

6. The method of claim 5 wherein said polydispersity is in the range of from about 2 to about 3.

7. The method of claim 1 wherein the density of said low polydispersity polymer is in the range of from about 0.88 to about 0.93 g/cm$^3$.

8. The method of claim 7 wherein the density of said low polydispersity polymer is in the range of from about 0.88 to about 0.925 g/cm$^3$.

9. The method of claim 1 wherein the melt index of said low polydispersity polymer is in the range of about 0.5 to about 5 g/10 min.

10. The method of claim 9 wherein the melt index of said low polydispersity polymer is in the range of about 0.5 to about 2 g/10 min.

11. The method of claim 1 wherein the melt flow ratio of said low polydispersity polymer is in the range of from about 14 to about 20.

12. The method of claim 11 wherein the melt flow ratio of said low polydispersity polymer is in the range of from about 16 to about 18.

13. The method of claim 1 wherein said low polydispersity polymer is made with a metallocene catalyst.

14. The method of claim 1 wherein at least one of said first layer and said second layer has a cling force to the other layer of at least about 180 grams/inch.

15. The method of claim 14 wherein at least one of said first layer and said second layer has a cling force to the other layer of at least about 200 grams/inch.

16. The method of claim 15 wherein at least one of said first layer and said second layer has a cling force to the other layer of at least about 220 grams/inch.

17. The method of claim 1 wherein at least one of said first layer and said second layer has a cling force to the other layer in the range from about 140 to about 280 grams/inch.

18. The method of claim 1 wherein the F-50 dart drop value of the stretch wrap film is at least about 200 g/mil.

19. The method of claim 18 wherein the F-50 dart drop value of the stretch wrap film is at least about 250 g/mil.

20. The method of claim 1 wherein the transverse direction tear resistance of the stretch wrap film is at least about 450 g/mil.

21. The method of claim 20 wherein the transverse direction tear resistance of the stretch wrap film is at least about 500 g/mil.

22. The method of claim 21 wherein the transverse direction tear resistance of the stretch wrap film is at least about 550 g/mil.

23. The method of claim 1 wherein the machine direction tear resistance of the stretch wrap film is at least about 100 g/mil.

24. The method of claim 23 wherein the machine direction tear resistance of the stretch wrap film is at least about 150 g/mil.

25. The method of claim 24 wherein the machine direction tear resistance of the stretch wrap film is at least about 175 g/mil.

26. The method of claim 1 wherein the stretch wrap film has a machine direction stress level at 200% elongation of at least 1700 psi.

27. The method of claim 26 wherein the stretch wrap film has a machine direction stress level at 200% elongation of at least 1850 psi.

28. The method of claim 27 wherein the stretch wrap film has a machine direction stress level at 200% elongation of at least 2000 psi.

29. The method of claim 1 wherein the stretch wrap film has a machine direction stress level at 250% elongation of at least 1800 psi.

30. The method of claim 29 wherein the stretch wrap film has a machine direction stress level at 250% elongation of at least 1950 psi.

31. The method of claim 30 wherein the stretch wrap film has a machine direction stress level at 250% elongation of at least 2100 psi.

32. The method of claim 1 wherein the second monomer of said first layer and said second layer are independently selected from the group consisting of propylene, 1-butene, 1-pentene, 1-hexene, 3-methyl-1-pentene, 4-methyl-1-pentene, 1-octene, 1-decene, and 1-dodecene.

33. The method of claim 32 wherein the second monomer of said first layer and said second layer are independently selected from the group consisting of 1-butene, 1-hexene, and 1-octene.

34. The method of claim 1 wherein said low polydispersity polymer comprises a polyethylene copolymer or terpolymer.

35. The method of 1 wherein the stretch wrap film has a maximum stretch % of at least about 370%.

36. The method of 35 wherein the stretch wrap film has a maximum stretch % of at least about 400%.

37. The method of claim 1 wherein the melt index of said high pressure low density polyethylene is from about 1 to about 5 g/10 min.

38. The method of claim 37 wherein the melt index of said high pressure low density polyethylene is from about 1 to about 2.5 g/10 min.

39. The method of claim 1 wherein the density of said high pressure low density polyethylene is from about 0.915 to about 0.925 g/cm$^3$.

40. The method of claim 1 wherein the melt index of said very low density polyethylene is from about 1 to about 3 g/10 min.

41. The method of claim 1 wherein the density of said very low density polyethylene is from about 0.89 to about 0.91 g/cm$^3$.

42. The method of claim 1 wherein said stretch wrap film comprises from about 2 to about 30 wt. % of said high pressure low density polyethylene resin.

43. The method of claim 42 wherein said stretch wrap film comprises from about 5 to about 15 wt. % of said high pressure low density polyethylene resin.

44. The method of claim 1 wherein said stretch wrap film comprises from about 2 to about 30 wt. % of said very low density polyethylene resin.

45. The method of claim 44 wherein said stretch wrap film comprises from about 15 to about 25 wt. % of said very low density polyethylene resin.

46. The method of claim 1 further comprising an outer high cling layer located on a surface of said first layer opposite of said inner polymeric layer.

47. The method of claim 46 wherein said outer high cling layer has a cling force to the second layer of at least about 300 grams/inch as determined by ASTM D5458-94.

48. The method of claim 47 wherein said outer high cling layer is chosen from thegroup consisting of an ethylene-acrylate polymer and a very low density polyethylene.

49. The method of claim 48 wherein said very low density polyethylene of said outer high cling layer has a density of from about 0.88 g/cm$^3$ to about 0.912 g/cm$^3$.

50. The method of claim 46 further comprising an outer slip layer located on a surface of said second layer opposite of said inner polymer layer.

51. The method of claim 50 wherein said outer slip layer is chosen from the group consisting of polyethylene, polypropylene and combinations thereof.

52. The method of claim 1 further comprising a second inner polymeric layer located on a surface of the first inner polymeric layer.

53. The method of claim 52 wherein said second inner polymeric layer comprises a blend of a low polydispersity polymer and either a high pressure low density polyethylene resin, a very low density polyethylene resin or combinations thereof, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22, said high pressure low density polyethylene resin having a melt index ($I_2$) of from about 1 to about 10 g/10 min. and a density of from about 0.9 to about 0.935 g/cm$^3$, said very low density polyethylene resin having a melt index ($I_2$) of from about 0.5 to about 5 g/10 min, and a density of from about 0.880 to about 0.912 g/cm$^3$.

54. A method for wrapping an article, comprising:
  wrapping the article with a multilayer, thermoplastic stretch wrap film containing at least three polymeric film layers, said film comprising
    (a) a first layer comprising a polymer of two or more monomers, wherein the first monomer is ethylene, in a major amount by weight, and the second monomer is an alpha olefin of from about 3 to about 12 carbon atoms, in a minor amount by weight;
    (b) an outer high cling layer has sufficient cling resulting from inherent cling alone, cling additives or a combination thereof so as to produce a cling force to the first layer of at least about 300 grams/inch as determined by ASTM D5458-94; and
    (c) at least one inner polymeric layer, located between said first layer and said second layer, comprising a blend of a low polydispersity polymer and either a high pressure low density polyethylene resin, a very low density polyethylene resin or combinations thereof, said low polydispersity polymer having a polydispersity of from about 1 to about 4, a melt index ($I_2$) of from about 0.5 to about 10 g/10 min., a melt flow ratio ($I_{20}/I_2$) of from about 12 to about 22 and comprising at least about 70 wt. % of the total amount of said inner polymeric layer(s), said high pressure low density polyethylene resin having a melt index ($I_2$) of from about 1 to about 10 g/10 min. and a density of from about 0.9 to about 0.935 g/cm³, said very low density polyethylene resin having a melt index ($I_2$) of from about 0.5 to about 5 g/10 min, and a density of from about 0.880 to about 0.912 g/cm³;

so as to produce a stretch wrap film having a maximum stretch of at least 340%, and an F-50 dart drop value of at least about 150 g/mil as determined by ASTM D1709, and whereby said stretch wrap film is stretched during the wrapping step.

55. The method of claim 54 wherein said outer high cling layer is chosen from the group consisting of an ethylene-acrylate polymer and a very low density polyethylene.

56. The method of claim 55 wherein said very low density polyethylene has a density of from about 0.88 g/cm³ to about 0.910 g/cm³.

57. A method for wrapping an article, comprising
wrapping the article with a multilayer, thermoplastic stretch wrap film containing at least three polymeric film layers, said film comprising
(a) an outer high cling layer;
(b) an outer slip layer, said outer high cling force has sufficient cling resulting from inherent cling alone, cling additives or a combination thereof so as to produce a cling force to said outer slip layer of at least about 300 grams/inch as determined by ASTM D5458-94; and
(c) at least one inner polymeric layer, located between said outer slip layer and said outer high cling layer, comprising a blend of a low polydispersity polymer and either a high pressure low density polyethylene resin, a very low density polyethylene resin or combinations thereof, said low polydispersity polymer having a polydispersity of from about 1 to about 4, a melt index ($I_2$) of from about 0.5 to about 10 g/10 min., a melt flow ratio ($I_{20}/I_2$) of from about 12 to about 22 and comprising at least about 70 wt. % of the total amount of said inner polymeric layer(s), said high pressure low density polyethylene resin having a melt index ($I_2$) of from about 1 to about 10 g/10 min. and a density of from about 0.9 to about 0.935 g/cm³, said very low density polyethylene resin having a melt index ($I_2$) of from about 0.5 to about 5 g/10 min, and a density of from about 0.880 to about 0.912 g/cm³;

so as to produce a stretch wrap film having a maximum stretch of at least 340%, and an F-50 dart drop value of at least about 150 g/mil as determined by ASTM D1709, and whereby said stretch wrap film is stretched during the wrapping step.

58. The method of claim 57 wherein said outer high cling layer is chosen from the group consisting of an ethylene-acrylate polymer and a very low density polyethylene.

59. The method of claim 58 wherein said very low density polyethylene of said outer high cling layer has a density of from about 0.88 g/cm³ to about 0.910 g/cm³.

60. The method of claim 57 wherein said slip layer is chosen from the group consisting of polyethylene, polypropylene and combinations thereof.

61. A method for wrapping an article, comprising:
wrapping the article with a multilayer, thermoplastic stretch wrap film containing at least three polymeric film layers, said film comprising
(a) a first polymeric cling layer;
(b) a second polymeric cling layer; and
(c) at least one inner polymeric layer, located between said first polymeric cling layer and said second polymeric cling layer, comprising a blend of a low polydispersity polymer and either a high pressure low density polyethylene resin, a very low density polyethylene resin or combinations thereof, said low polydispersity polymer comprising a polyethylene copolymer or terpolymer having a polydispersity of from about 1 to about 4, a melt index ($I_2$) of from about 0.5 to about 10 g/10 min., and a melt flow ratio ($I_{20}/I_2$) of from about 12 to about 22, said polyethylene copolymer or terpolymer comprising at least about 70 wt. % of the total amount of said inner polymeric layer(s), said high pressure low density polyethylene resin having a melt index ($I_2$) of from about 1 to about 10 g/10 min. and a density of from about 0.9 to about 0.935 g/cm³, said very low density polyethylene resin having a melt index ($I_2$) of from about 0.5 to about 5 g/10 min, and a density of from about 0.880 to about 0.912 g/cm³;

wherein said stretch wrap film comprises at least about 60 wt. % of the total amount of said inner polymeric layer(s);

so as to produce a stretch wrap film having a maximum stretch of at least 340%, and an F-50 dart drop value of at least about 150 g/mil as determined by ASTM D1709, and whereby said stretch wrap film is stretched during the wrapping step.

62. The method of claim 61 wherein the first polymeric cling layer and the second polymeric cling layer comprise two or more monomers, wherein the first monomer is ethylene, in a major amount by weight, and the second monomer is an alpha olefin of from about 3 to about 12 carbon atoms, in a minor amount by weight.

63. The method of claim 61 wherein at least one of said first polymeric cling layer and said second polymeric cling layer has a cling force to the other layer of at least about 140 grams/inch as determined by ASTM D5458-94.

64. The method of claim 63 wherein at least one of said first polymeric cling layer and said second polymeric cling layer has a cling force to the other layer of at least about 220 grams/inch.

65. The method of claim 61 wherein said stretch wrap film comprises at least about 70 wt. % of the total amount of said inner polymeric layer(s).

66. The method of claim 61 wherein said polydispersity is in the range of from about 1.5 to about 4.

67. The method of claim 61 wherein the density of said polyethylene copolymer or terpolymer is in the range of from about 0.88 to about 0.93 g/cm³.

68. The method of claim 61 wherein the melt index of said polyethylene copolymer or terpolymer is in the range of about 0.5 to about 2 g/10 min.

69. The method of claim 61 wherein the melt flow ratio of said polyethylene copolymer or terpolymer is in the range of from about 14 to about 20.

70. The method of claim 61 wherein said polyethylene copolymer or terpolymer is made with a metallocene catalyst.

71. The method of claim 61 wherein the F-50 dart drop value of the stretch wrap film is at least about 200 g/mil.

72. The method of claim 61 wherein the transverse direction tear resistance of the stretch wrap film is at least about 500 g/mil.

73. The method of claim 61 wherein the machine direction tear resistance of the stretch wrap film is at least about 150 g/mil.

74. The method of claim 62 wherein the second monomer of said first polymeric cling layer and said second polymeric cling layer are independently selected from the group consisting of propylene, 1-butene, 1-pentene, 1-hexene, 3-methyl-1-pentene, 4-methyl-1-pentene, 1-octene, 1-decene, and 1-dodecene.

75. The method of claim 61 wherein the stretch wrap film has a machine direction stress level at 200% elongation of at least 1700 psi.

76. The method of claim 61 wherein the stretch wrap film has a machine direction stress level at 250% elongation of at least 1800 psi.

77. The method of claim 61 wherein the stretch wrap film has a maximum stretch % of at least about 400%.

78. The method of claim 61 wherein the melt index of said high pressure low density polyethylene resin is from about 1 to about 5 g/10 min.

79. The method of claim 61 wherein the density of said high pressure low density polyethylene resin is from about 0.915 to about 0.925 g/cm$^3$.

80. The method of claim 61 wherein the melt index of said very low density polyethylene resin is from about 1 to about 3 g/10 min.

81. The method of claim 61 wherein the density of said very low density polyethylene resin is from about 0.89 to about 0.91 g/cm$^3$.

82. The method of claim 61 wherein at least one of said inner polymeric layer(s) comprises from about 2 to about 30 wt. % of said high pressure low density polyethylene resin.

83. The method of claim 82 wherein at least one of said inner polymeric layer(s) comprises from about 5 to about 15 wt. % of said high pressure low density polyethylene resin.

84. The method of claim 61 wherein at least one of said inner polymeric layer(s) comprises from about 2 to about 30 wt. % of said very low density polyethylene resin.

85. The method of claim 84 wherein at least one of said inner polymeric layer(s) comprises from about 15 to about 25 wt. % of said very low density polyethylene resin.

86. A method for wrapping an article, comprising:
wrapping the article with a multilayer, thermoplastic stretch wrap film containing at least three polymeric film layers, said film comprising
(a) a first layer comprising a linear low density polyethylene resin, said linear low density polyethylene resin has a density from about 0.89 to about 0.94 g/cm$^3$ and a melt index ($I_2$) of from about 1 to about 10 g/10 min., and contains from about 2 to about 8 weight percent n-hexane extractables;
(b) a second layer comprising a linear low density polyethylene resin, said linear low density polyethylene resin has a density from about 0.89 to about 0.94 g/cm$^3$ and having a melt index ($I_2$) of from about 1 to about 10 g/10 min., and contains from about 2 to about 8 weight percent n-hexane extractables, said first layer and said second layer has a cling force to the other layer of at least about 140 grams/inch as determined by ASTM D5458-94; and
(c) at least one inner polymeric layer, located between said first layer and said second layer, comprising a blend of a low polydispersity polymer and either a high pressure low density polyethylene resin, a very low density polyethylene resin or combinations thereof, said low polydispersity polymer comprising a polyethylene copolymer or polyethylene having a polydispersity of from about 1 to about 4, a melt index ($I_2$) of from about 0.5 to about 10 g/10 min., and a melt flow ratio ($I_{20}/I_2$) of from about 12 to about 22, said polyethylene copolymer or terpolymer comprising at least about 70% wt. % of the total amount of said inner polymeric layer(s), said high pressure low density polyethylene resin having a melt index ($I_2$) of from about 1 to about 10 g/10 min. and a density of from about 0.9 to about 0.935 g/cm$^3$, said very low density polyethylene resin having a melt index ($I_2$) of from about 0.5 to about 5 g/10 min, and a density of from about 0.880 to about 0.912 g/cm$^3$;

wherein said stretch wrap film comprises at least about 60 wt. % of the total amount of said inner polymeric layer(s);

so as to produce a stretch wrap film having a maximum stretch of at least 340%, and an F-50 dart drop value of at least about 150 g/mil as determined by ASTM D1709, and whereby said stretch wrap film is stretched during the wrapping step.

87. The method of claim 57 further including a first layer located between said inner polymeric layer and said outer slip layer.

88. The method of claim 1 wherein said inherent cling is partially from n-hexane extractables.

89. The method of claim 1 wherein said cling force is partially from at least one cling additive.

90. The method of claim 89 wherein said cling additive is poly-isobutylene.

91. The method of claim of claim 1 wherein said first layer and said second layer are independently selected from the group consisting of linear low density polyethylene, very low density polyethylene, high pressure low density polyethylene, ethylene-acrylate polymers and mixtures thereof.

92. The method of claim 54 wherein said inherent cling is partially from n-hexane extractables.

93. The method of claim 54 wherein said cling force is partially from at least one cling additive.

94. The method of claim 57 wherein said inherent cling is partially from n-hexane extractables.

95. The method of claim 57 wherein said cling force is partially from at least one cling additive.

96. The method of claim 61 wherein said inherent cling is partially from n-hexane extractables.

97. The method of claim 61 wherein said cling force is partially from at least one cling additive.

98. The method of claim 97 wherein said cling additive is poly-isobutylene.

99. The method of claim 61 wherein said first polymeric cling layer and said second polymeric cling layer are made from olefin polymer resins.

100. The method of claim 99 wherein at least one of said olefin polymer resins is a copolymer, said copolymer comprising an olefin monomer with a second monomer.

101. The method of claim 100 wherein said olefin polymer resin is an ethylene-acrylate polymer, said ethylene-acrylate polymer being selected from the group consisting of methyl, ethyl, and n-butyl acrylate.

102. The method of claim 61 wherein said first polymeric cling layer and said second polymeric cling layer are independently selected from the group consisting of linear low density polyethylene, very low density polyethylene, high pressure low density polyethylene, ethyleneacrylate polymers and mixtures thereof.

103. The method of claim 102 wherein the acrylate of said ethylene-acrylate polymers is selected from the group consisting of methyl, ethyl and n-butyl acrylate.

104. The method of claim 61 wherein said stretch wrap film has a maximum stretch of at least about 360%.

105. The method of claim 104 wherein said stretch wrap film has a maximum stretch of at least about 380%.

* * * * *

UNITED STATES PATENT AND TRADEMARK OFFICE
CERTIFICATE OF CORRECTION

PATENT NO.: 5,907,943
DATED: June 1, 1999
INVENTOR(S): Eichbauer

It is certified that errors appear in the above-identified patent, and that said Letters Patent is hereby corrected as shown below.

Column 17, Claim 35, line 46, after "of" insert --Claim--

Column 17, Claim 36, line 48, after "of" insert --Claim--

Column 18, Claim 48, line 17, delete "thegroup" and insert --the group--

Column 22, Claim 86, line 11, after "70" delete "%"

Column 22, Claim 91, line 42, after "method" delete "of claim"

Column 23, Claim 102, line 9, delete "ethyleneacrylate" and insert --ethylene acrylate--

Signed and Sealed this

Eighth Day of February, 2000

Attest:

Q. TODD DICKINSON

Attesting Officer

Commissioner of Patents and Trademarks